(12) United States Patent
Epstein et al.

(10) Patent No.: US 11,503,360 B2
(45) Date of Patent: Nov. 15, 2022

(54) ADAPTIVE REMOTE CONTROL

(71) Applicant: Comcast Cable Communications, LLC, Philadelphia, PA (US)

(72) Inventors: Neil Epstein, Havertown, PA (US); Jonathan Elison, King of Prussia, PA (US); Michael Jou, Philadelphia, PA (US); Julie Biron Maletz, Philadelphia, PA (US); Thomas Loretan, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/638,944

(22) Filed: Mar. 4, 2015

(65) Prior Publication Data
US 2016/0261903 A1    Sep. 8, 2016

(51) Int. Cl.
*H04N 21/422*  (2011.01)
*H04N 21/41*  (2011.01)

(52) U.S. Cl.
CPC .  *H04N 21/42227* (2013.01); *H04N 21/41265* (2020.08); *H04N 21/42204* (2013.01);
(Continued)

(58) Field of Classification Search
CPC ...... G06F 3/00; G06F 3/048; G06F 17/30058; G06F 3/16; G06F 3/167; G06F 8/20; G06F 8/34; G06F 3/04886; G06F 3/0482; G06F 3/0481; G06F 1/1692; G06F 17/03; H04N 21/47; H04N 5/4403; H04N 21/4622; H04N 21/42227; H04N 21/42208; H04N 21/42222; H04N 21/42221; H04N 21/42224; H04N 21/42207; H04N 2005/4408; H04N 2005/4407; H04N 2005/443; H04N 2005/4439; H04N 2005/4432; H04N 21/42204; H04N 21/41265; H04N 21/42206; G11B 27/022
(Continued)

(56) References Cited

U.S. PATENT DOCUMENTS 5,598,523 A * 1/1997 Fujita .................... G06F 3/0482
348/114
6,246,442 B1 * 6/2001 Harada ................. G06F 17/211
348/563
(Continued)

FOREIGN PATENT DOCUMENTS

EP    2667583    1/2014
WO   WO 2007/023414   5/2007

*Primary Examiner* — Grant Sitta
(74) *Attorney, Agent, or Firm* — BakerHostetler

(57) ABSTRACT

A remote control that receives state information from an associated media device is disclosed. The remote control, in response to receiving data indicating that the media device is in a content state, may update an input assembly to indicate that the assembly may be used to perform a movement function. The remote control may instruct the media device to perform a movement function in response to a selection gesture, where the degree of movement is a single unit. In response to a swipe gesture, the remote control may instruct the media device to perform a linear movement with a greater degree of movement. Buttons and functions of the remote control may be further adapted in response to a menu-based state, or other states of the media device.

20 Claims, 12 Drawing Sheets

(52) U.S. Cl.
CPC . *H04N 21/42208* (2013.01); *H04N 21/42221* (2013.01); *H04N 21/42222* (2013.01); *H04N 21/42224* (2013.01); *H04N 21/42206* (2013.01)

(58) Field of Classification Search
USPC .................................................. 345/156–173
See application file for complete search history.

(56) References Cited

U.S. PATENT DOCUMENTS

| | | | | |
|---|---|---|---|---|
| 6,266,059 | B1* | 7/2001 | Matthews, III | G06F 9/451 715/810 |
| 6,538,556 | B1* | 3/2003 | Kawajiri | G08C 17/02 340/12.52 |
| 6,545,587 | B1 | 4/2003 | Hatakeyama et al. | |
| 6,784,872 | B1 | 8/2004 | Matsui et al. | |
| 7,013,434 | B2* | 3/2006 | Masters | G08C 17/00 386/234 |
| 7,132,973 | B2* | 11/2006 | Jindal | G08C 17/02 341/176 |
| 7,155,305 | B2* | 12/2006 | Hayes | H04L 12/2805 700/224 |
| 7,330,174 | B2 | 2/2008 | du Breuil | |
| 7,487,000 | B1 | 2/2009 | Chevalier et al. | |
| 7,492,277 | B2 | 2/2009 | Zigmond et al. | |
| 7,683,856 | B2 | 3/2010 | Sakai et al. | |
| 7,937,733 | B2* | 5/2011 | Katayama | H04N 5/4403 725/141 |
| 7,966,568 | B2* | 6/2011 | Kim | G06F 3/03547 345/173 |
| 8,531,276 | B2* | 9/2013 | Harris | G08C 17/02 340/12.22 |
| 8,537,286 | B2* | 9/2013 | Bae | H04N 21/42208 348/734 |
| 8,659,553 | B1* | 2/2014 | Chan | G06F 3/0488 345/169 |
| 8,698,745 | B2* | 4/2014 | Reams | H04N 21/42224 345/158 |
| 8,918,544 | B2* | 12/2014 | Chardon | H04N 5/44 710/15 |
| 9,172,897 | B2* | 10/2015 | Carvajal | G06F 3/03547 |
| 9,462,210 | B2* | 10/2016 | Dagit, III | G06F 3/017 |
| 9,721,375 | B1 | 8/2017 | Rivard | G06T 13/80 |
| 10,088,908 | B1* | 10/2018 | Poupyrev | G06F 1/163 |
| 2002/0044199 | A1* | 4/2002 | Barzebar | H04N 7/141 348/14.01 |
| 2004/0041723 | A1* | 3/2004 | Shibamiya | G06F 3/0485 341/176 |
| 2005/0080496 | A1* | 4/2005 | Hayes | G06F 1/1626 700/65 |
| 2005/0200598 | A1* | 9/2005 | Hayes | H04B 1/202 345/156 |
| 2006/0050142 | A1* | 3/2006 | Scott | G08C 23/04 348/14.05 |
| 2007/0229465 | A1* | 10/2007 | Sakai | G11B 19/025 345/173 |
| 2008/0005764 | A1* | 1/2008 | Arling | H04H 60/46 725/39 |
| 2008/0165132 | A1* | 7/2008 | Weiss | G06F 3/04883 345/173 |
| 2008/0174449 | A1* | 7/2008 | Schmidt | G08C 17/00 340/4.3 |
| 2009/0014517 | A1 | 1/2009 | Gelbman | |
| 2009/0143877 | A1* | 6/2009 | Panje | G06F 1/1694 700/83 |
| 2009/0153288 | A1* | 6/2009 | Hope | H04M 1/72533 340/3.1 |
| 2009/0322552 | A1* | 12/2009 | Machimura | H04N 5/4403 340/12.55 |
| 2010/0037180 | A1* | 2/2010 | Elias | G06F 3/04886 715/840 |
| 2010/0201618 | A1* | 8/2010 | Lorente | G06F 1/169 345/157 |
| 2011/0025598 | A1* | 2/2011 | Underkoffler | G06F 3/0325 345/156 |
| 2011/0163944 | A1* | 7/2011 | Bilbrey | H04L 67/18 345/156 |
| 2011/0205156 | A1* | 8/2011 | Gomez | G06F 3/0346 345/157 |
| 2011/0279223 | A1* | 11/2011 | Hatambeiki | G06F 3/02 340/4.3 |
| 2011/0298700 | A1* | 12/2011 | Ito | G06F 3/038 345/156 |
| 2012/0032901 | A1* | 2/2012 | Kwon | H04N 21/482 345/173 |
| 2012/0033140 | A1* | 2/2012 | Xu | H04N 21/4122 348/734 |
| 2012/0062471 | A1* | 3/2012 | Poulidis | H04N 5/4403 345/173 |
| 2012/0144299 | A1* | 6/2012 | Patel | G06F 3/0488 715/702 |
| 2012/0162073 | A1* | 6/2012 | Kryze | G06F 3/017 345/158 |
| 2012/0162123 | A1* | 6/2012 | Kent | G06F 3/044 345/174 |
| 2012/0185801 | A1* | 7/2012 | Madonna | H04N 21/42208 715/834 |
| 2012/0229370 | A1* | 9/2012 | Stroffolino | G09G 3/20 345/156 |
| 2012/0274596 | A1* | 11/2012 | Ludwig | G06F 3/0412 345/173 |
| 2012/0293449 | A1* | 11/2012 | Dietz | G06F 3/0414 345/174 |
| 2013/0147833 | A1* | 6/2013 | Aubauer | G06F 3/044 345/619 |
| 2013/0263193 | A1* | 10/2013 | Hirano | H04N 21/2387 725/88 |
| 2013/0307792 | A1* | 11/2013 | Andres | G11B 27/005 345/173 |
| 2014/0210754 | A1* | 7/2014 | Ryu | G06F 1/1694 345/173 |
| 2014/0267932 | A1* | 9/2014 | Riddell | G06F 3/03547 348/734 |
| 2015/0193069 | A1* | 7/2015 | Di Censo | G09G 5/12 345/173 |

* cited by examiner

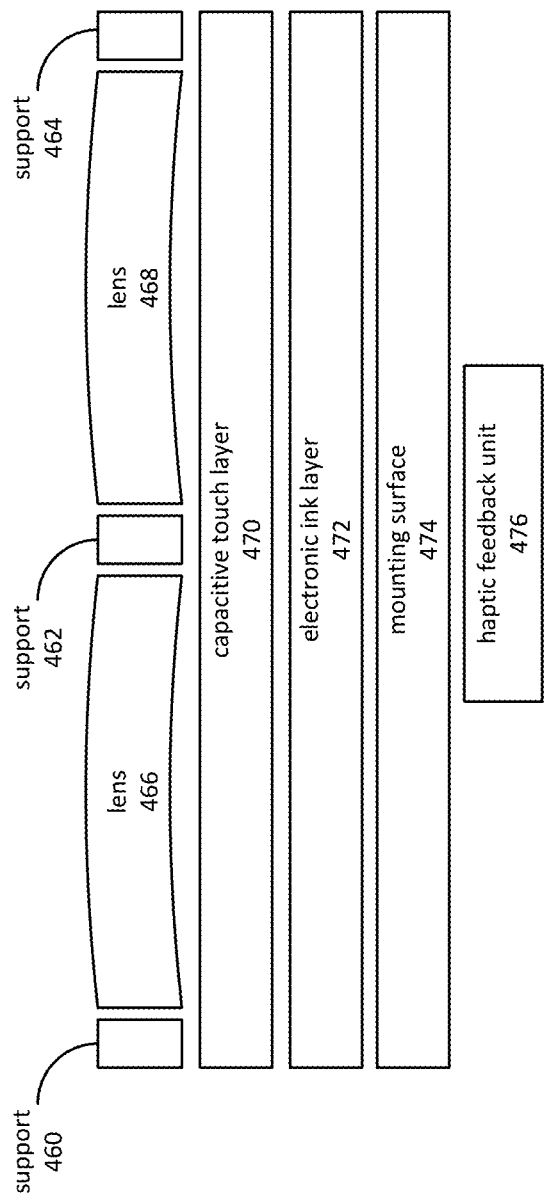

ADAPTIVE REMOTE CONTROL

BACKGROUND

A typical remote control is a device including a potentially large number of buttons arranged in various patterns. The buttons may be colored or labeled according to their function. An arrangement of buttons sometimes referred to as a "control pad" or "d-pad" may be used for a variety of functions that are context-dependent, such as navigating menus. Because the remote control may be used for a variety of functions, the colors and labels convey little information. These and other shortcomings are addressed by the disclosure.

SUMMARY

Disclosed herein are systems, methods, and computer program products related to a remote control that receives state information from a media device and utilizes dynamically configurable input, e.g., button, assemblies to provide input and output mechanisms customized to the current state of the media device. A media device, such as a set-top box, smart phone or television, can transition between various states, including the states of playing linear or time-shifted content such as movies or television programs, providing page-based content such as program listings or configuration menus, or being in an inactive sleep mode. In one aspect, a media controller transmits information concerning its current state to the remote control. In response to the media device changing its current state, the remote control updates its buttons (e.g., soft keys, or other input mechanisms) with graphical indicia and other information relevant to the current state of the media device. The remote control may also effectuate a change to the function of each button, based on the change of the media device's current state.

In another aspect, the remote control includes a plurality of input assemblies that can be graphically reconfigured. Furthermore, the button assemblies contain input mechanisms that support a variety of possible means of interacting with the button, in addition to the traditional "press" gesture. For example, an instance of an input assembly can include a lens, an electronic ink layer, a capacitive touch layer, and an additional element to provide a tactile feedback, such as a switch or haptic feedback component. The lens is shaped to provide a desired feel for the button, and may be colored to improve the appearance and organization of the remote control. The lens may also optically enhance the output of the electronic ink layer. The remote control, upon receiving updated state information from the media device, causes the electronic ink layer of the input assembly to display graphical indicia that is relevant to the current state of the media device and the current function of the button. The capacitive touch layer of the input assembly captures input from the user. A variety of gestures, such as press and swipe gestures, may be detected.

In another aspect, the remote control may respond to different gestures based upon the current state of the media device. When the media device is playing back content, such as a movie or television program, the remote control might respond to a selection gesture, e.g. a press gesture by causing the media device to perform a relatively small forwards or backwards movement in the movie or television program. In response to a swipe gesture, the remote control might cause the content to move forwards or backwards for a relatively large amount of time. When the media device is displaying page or menu-based content, such as a directory listing or configuration menu, the remote control may respond to a selection gesture by issuing a command to move forward a single page, and to a swipe gesture by issuing a command to move forward a number of pages.

Additional advantages will be set forth in part in the description that follows or may be learned by practice. The advantages will be realized and attained by means of the elements and combinations listed in the appended claims. Both the foregoing general description and the following detailed description are exemplary and explanatory only.

BRIEF DESCRIPTION OF THE DRAWINGS

The accompanying drawings are incorporated in and constitute a part of this specification. Together with the description, the drawings may serve to explain operational principles of various methods, systems, computer-readable media, and computer program products disclosed herein. For the purposes of illustration, various examples of aspects of the disclosure are shown in the drawings; however, the invention is not limited to the specific methods and instrumentalities disclosed.

FIG. 4C depicts an example embodiment of an input assembly.

DETAILED DESCRIPTION

The disclosed systems, methods, and computer program products provide a remote control device that is adaptive to the current state of a media device. The adaptations include changes to graphical indicia displayed on buttons included in a remote control device, and changes to the functions performed by interacting with the buttons. An input assembly including an electronic ink layer, a capacitive touch layer, and a feedback component displays updated graphical indicia and supports a variety of input methods. An example of an adaptive remote control device may include a transmitter that receives data indicative of a current state of a media device. The media device may, for example, be in a content state while playing back a movie or television program. The remote control device, based on receiving the data indicating that the media device is in a content state, updates the iconography of a button to indicate that the button can be used to perform a movement function, such as fast-forwarding or skipping to a next chapter. In response to the button being pressed by a user, the remote sends instructions to the media device indicating that it should perform the movement function, with a single unit of movement. In response to the button being swiped by the user, the remote control device sends instructions indicating that the media device should perform a movement function over a number of units of movement. The number of units, or some other parameter of the function, may be proportional to some property of the swipe, such as its length or intensity.

The remote control device may be similarly adapted when the media device is in a page-based state, which could, for example, be when the media device is displaying a directory listing or a configuration menu. The remote control causes a button to display updated graphical indicia that is indicative of a next-page function. In response to a user pressing the button, the remote control device may, for example, issue instructions to the media device to perform a single-page movement function. In response to the user swiping the button, the remote control device may, for example, issue instructions to the media device to perform a page movement function over multiple pages.

Figure 1:
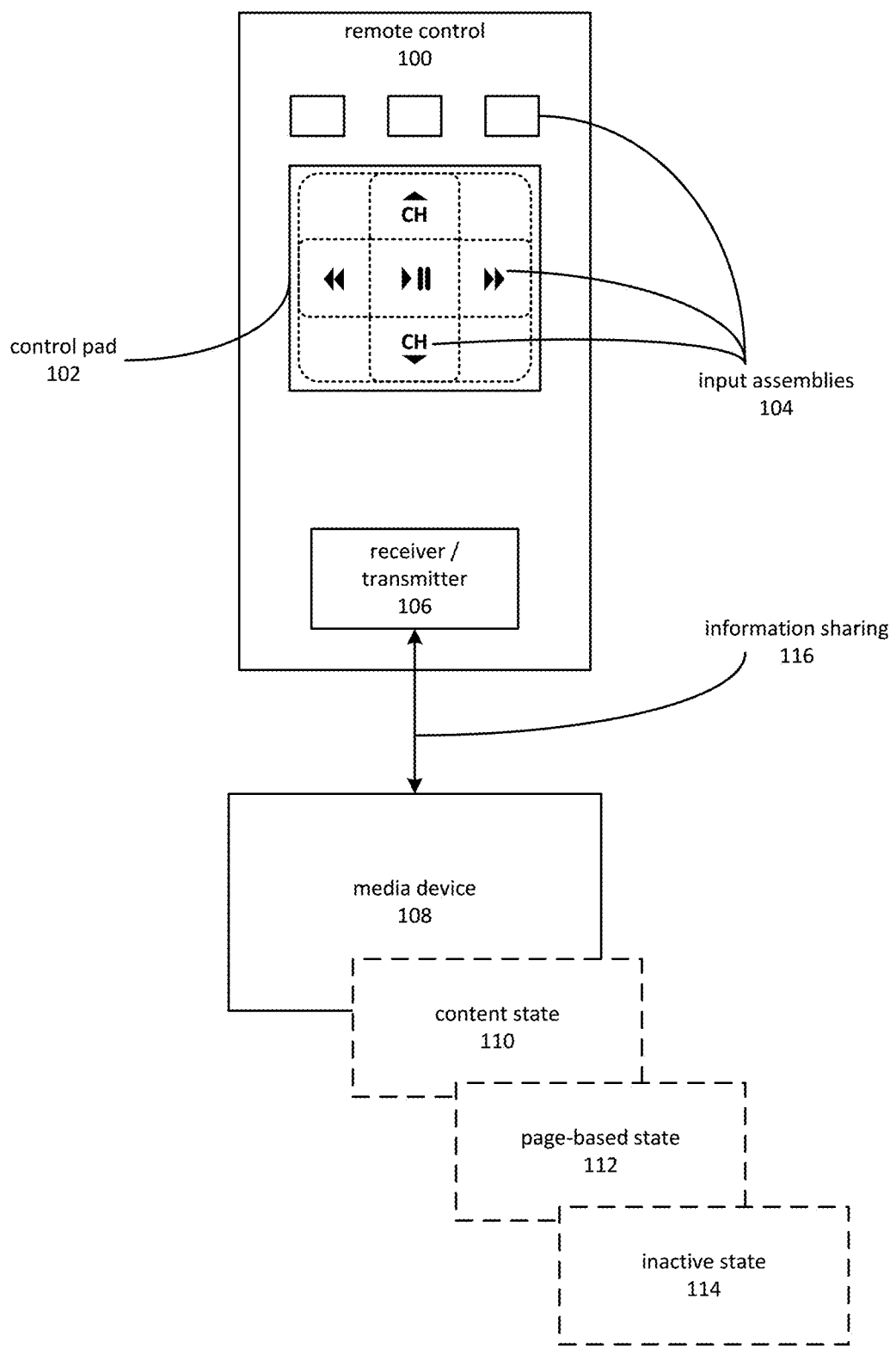
FIG. 1 is a block diagram depicting a remote control and media device.

FIG. 1 is a block diagram depicting a remote control and media device. A remote control 100 may comprise a control pad 102 configured to provide an adaptive control mechanism for a media device 108. The control pad 102 may comprise an arrangement of input (e.g., button) assemblies 104. Typically, control pad 102 may comprise a central input assembly, of input assemblies 104, surrounded by additional button assemblies at each of the four compass points. This arrangement is, however, only one of numerous possible arrangements of input assemblies 104 within control pad 102. A remote control 100 may contain button assemblies in addition to those incorporated into control pad 102, as well as other buttons or input/output mechanisms.

The remote control 100 may comprise a receiver/transmitter 106 for communicating with media device 108. The receiver/transmitter 106 may comprise various mechanisms for receiving data from media device 108 and for transmitting data to media device 108. Various communications mechanisms may be employed. Example mechanisms include BLUETOOTH, WI-FI, and other radio-frequency transmission methods, various optical transmission methods, such as infrared, and so on. In some instances, separate receiver and transmitter components may be employed. If so, separate communication methods for receiving and transmitting data may be used. Accordingly, the depiction in FIG. 1 of receiver/transmitter 106 as a single component should not be viewed as limiting the scope of the present disclosure. Various combinations of hardware and/or software components may be used to enable data communication between remote control 100 and media device 108.

Information sharing 116 involves media device 108 communicating data pertaining to the media device 108's current state to remote control 100. In various instances, information sharing 116 may involve periodic transmissions (e.g., broadcasts) of state information from media device 108 to remote control 100. Media device 108 may broadcast the state information on an ongoing basis, without necessarily being aware of the state of remote control 100, or other remote controls that might be within range of the transmission or might otherwise be accessible. For example, remote control 100 might be in a sleep state or power-off state while media device 108 is periodically broadcasting state information. The period of the transmissions may be based on minimizing delay that might be perceived by the user of remote control 100 when the remote is activated. Media device 108 might also transmit state information in response to a change of state, or in response to a request from remote control 100 to transmit information.

Information sharing 116 may also, in various instances, involve transmission of various forms of graphical indicia and textual data. The graphical indicia and textual data may be used to adapt remote control 100 to the state of media device 108. For example, remote control 100 may receive graphical indicia, such as a network logo or an image, taken from a television program that is scheduled to be recorded. Remote control 100 might then update an input assembly to display the indicia. In another instance, remote control 100 might receive graphical indicia corresponding to the next chapter of content or the next page of a page-based menu. Remote control 100 could update an input assembly with the graphical indicia. Interaction with the updated input assembly, such as a swipe or other gesture, could result in remote control 100 sending instructions to media device 108 to advance to the next chapter or page.

A media device 108 may include hardware and software components for controlling media-related functions of one or more output devices (not shown). Examples of output devices include television screens and audio speakers. A media device 108 may include hardware and/or software components for receiving, playing back, or generating media contents. Example hardware and/or software components may include components for receiving audiovisual information from a content provider or broadcaster, CD or DVD drives, graphics cards, and so on. Examples of a media device 108 include cable set-top boxes, televisions, gaming consoles, receivers, and so forth.

The media device 108 may be associated with a current state. In an embodiment, the media device 108 may be associated with one or more states such as a content state 110, a menu or page-based state 112, or an inactive state 114. In the content state 110, the media device may be presenting content transmitted by any method, such as broadcast, multicast or unicast, and may be linear or time-shifted. Embodiments may, however, include additional or alternative state associations. In some cases, media device 108 may be associated, at any one time, with multiple states.

Embodiments may associate media device 108 with a content state 110 when media device 108 is performing a function related to the display, playback, production, or reproduction of media content. For example, media device 108 may be associated with a content state 110 when it is playing a movie or audio recording. On the other hand, an embodiment might associate media device 108 with some other state when the playing of the movie or audio recording is paused. An embodiment might, for example, associate media device 108 with a paused state (not shown) when the movie or audio recording has been paused.

The media device 108 transmits data indicative of its current state to remote control 100. The data is received by receiver/transmitter 106 of remote control 100. Remote control 100 may then adjust input assemblies 104 to adapt functionality of control pad 102 to the playback state.

Embodiments may associate media device 108 with a menu or page-based state 112 when the media device 108 is, for example, displaying a program listing, guidebook, or other page-based display. The media device 108 transmits data indicative of the menu or page-based state 112 to remote control 100, via receiver/transmitter 106. Remote control 100 may then adjust input assemblies 104 to adapt functionality of control pad 102 to the program listing, guidebook, or other page-based display.

The media device 108 may enter an inactive state 114 when, for example, it is placed in standby mode or is displaying a screen saver. The media device 108 may transmit data indicative of the inactive state 114 to remote control 100, so that the input assemblies 104 of control pad 102 may be updated to reflect the inactive state 114.

Figure 2A:
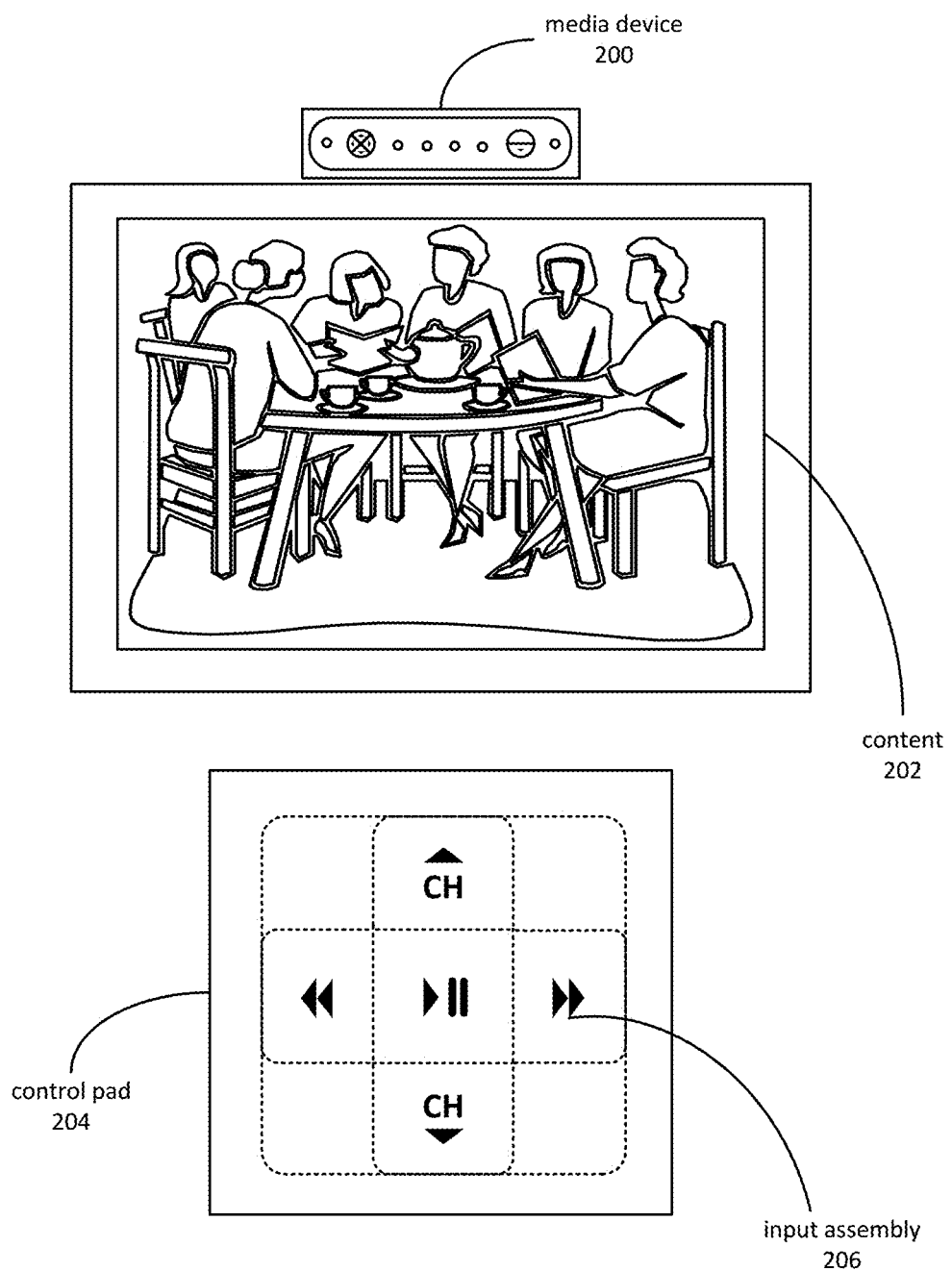
FIG. 2A is a block diagram depicting adjustment of remote control iconography for a content consumption state.

FIG. 2A is a block diagram depicting adjustment of a control pad iconography for a content state. A control pad 204 can include a number of button assemblies, such as input assembly 206. In response to receiving data indicating that media device 200 is playing content 202, a remote control (not shown) comprising control pad 204 may cause control pad 204 to display updated iconography indicative of functions that might be triggered while media device 200 is in a content state, e.g., during playback of a movie. The updated iconography could, for example, include a "fast forward" icon, as may be seen in FIG. 2A for input assembly 206.

Figure 2B:
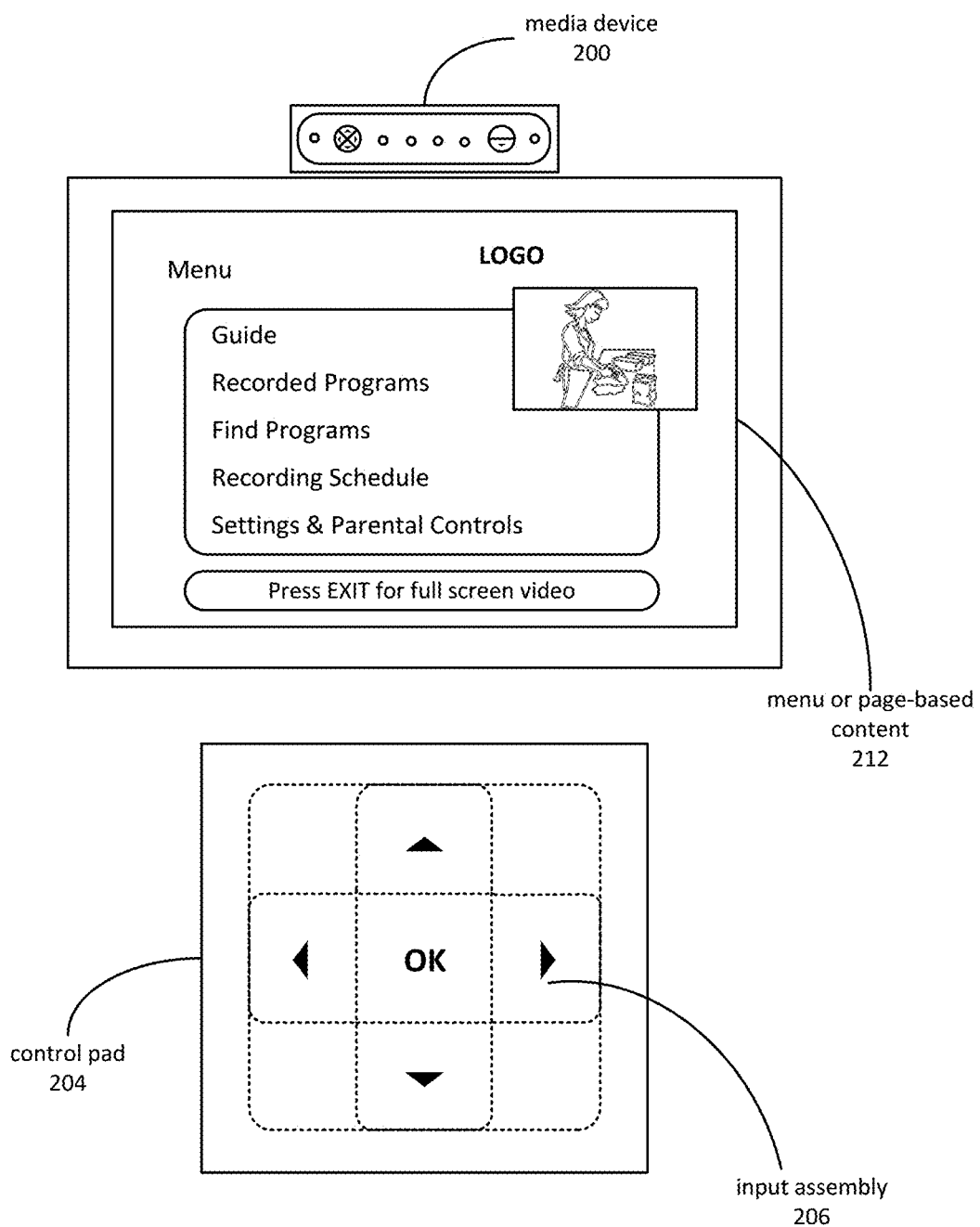
FIG. 2B is a block diagram depicting adjustment of remote control iconography for a menu-based state.

FIG. 2B is a block diagram depicting adjustment of control pad iconography for a page-based state. The media device 200 may be displaying menu or page-based content 212, such as a directory listing or menu. The media device 200 may transmit information indicating that it is in this state to the remote control (not shown) comprising control pad 204. The remote control may then update the iconography of control pad 204 to reflect the page-based state. For example, the remote control might cause input assembly 206 to display iconography indicating that the button may be used to perform a next-page function on media device 200.

Figure 2C:
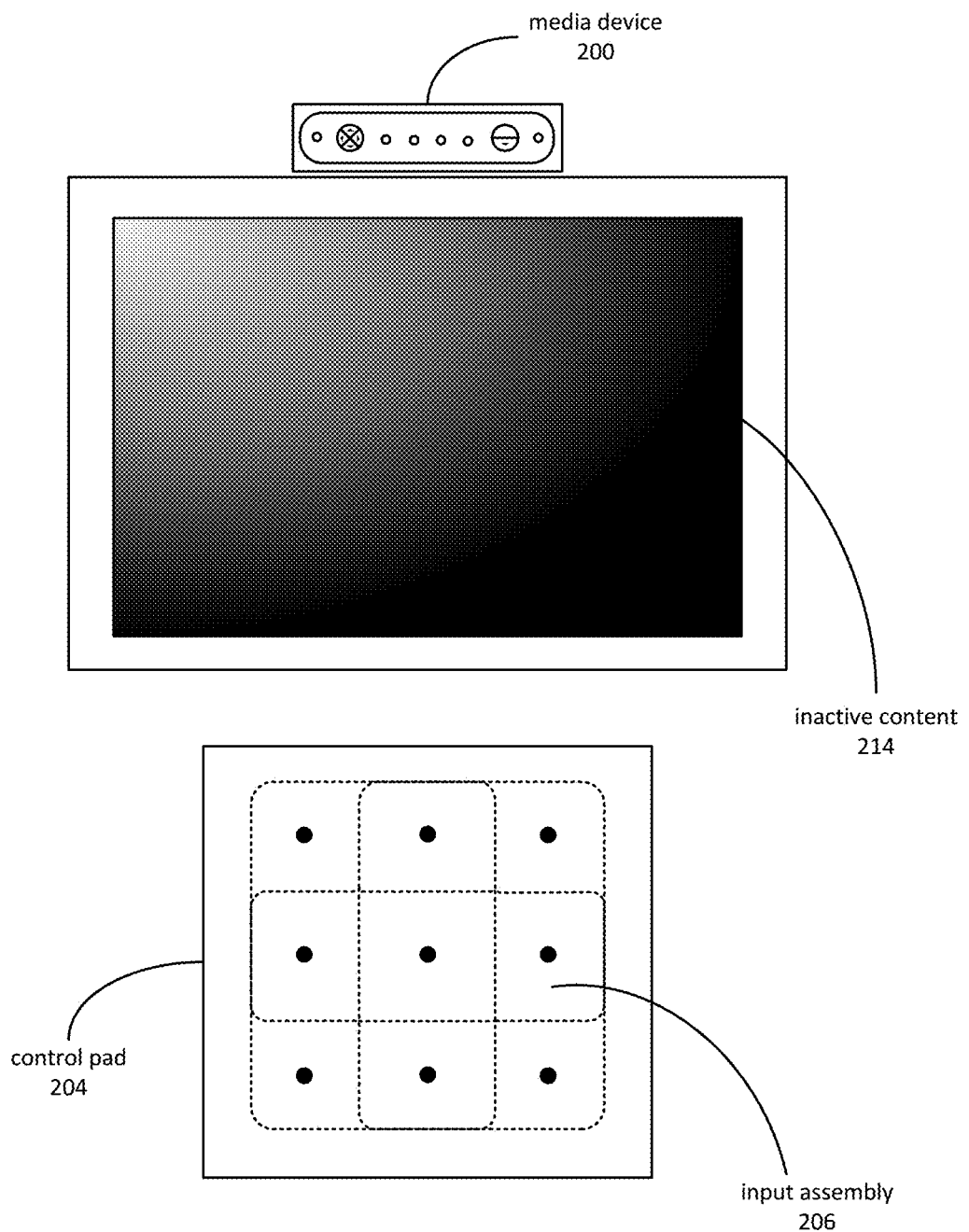
FIG. 2C is a block diagram depicting adjustment of remote control iconography for an inactive state.

FIG. 2C is a block diagram depicting adjustment of control pad iconography for an inactive state. The media device 200 may, for example, be in a sleep state and displaying inactive content 214, such as a blank screen or screen saver. The control pad 204 may be updated with iconography corresponding to the inactive state of media device 200. For example, input assembly 206 might be updated with iconography indicative of a default action, such as waking media device 200 from the inactive state.

Figure 3:
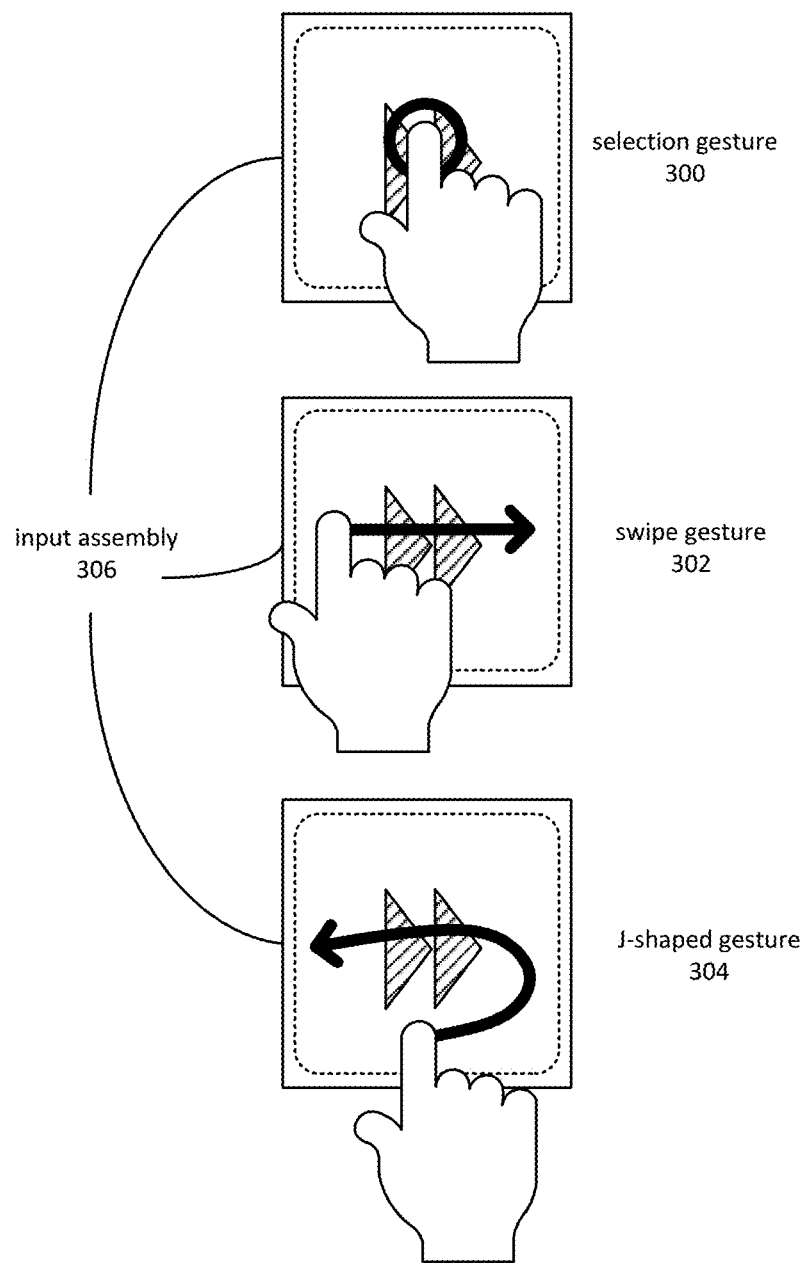
FIG. 3 depicts input gestures that may be detected by a remote control.

FIG. 3 depicts input gestures that may be detected by an input assembly. The three gestures depicted in FIG. 3 are intended to be illustrative, and should not be viewed as limiting. An input assembly 306 may be configured to detect a variety of gestures. A selection gesture 300 may be performed by a user in a manner similar to depressing a button. A swipe gesture 302 may be a linear movement in any direction, such as left, right, up, or down. A J-shaped gesture 304 may be a primarily linear gesture with a curved end, and may be similar to the letter "J." The J-shaped gesture 304 may be performed in any orientation, and the curved portion of the gesture may be oriented in a variety of ways relative to the linear portion. Other possible gestures include, but are not limited to gestures made with two or more fingers and proximity-based gestures such as drawing away from or approaching the input assembly.

The selection gesture 300 may be used to perform functions on a media device, such as media device 108, that are associated with the current state of media device 108. In a time-shifted content mode, the associated function may, for example, be associated with activating the fast forward button. When media device 108 is in a menu or page-based state 112, selection gesture 300 may result in a next page function being performed on media device 108, where the degree of movement is one page. When media device 108 is in an inactive state 114, selection gesture 300 may result in a wake function (not shown) being performed on media device 108.

Figure 4A:
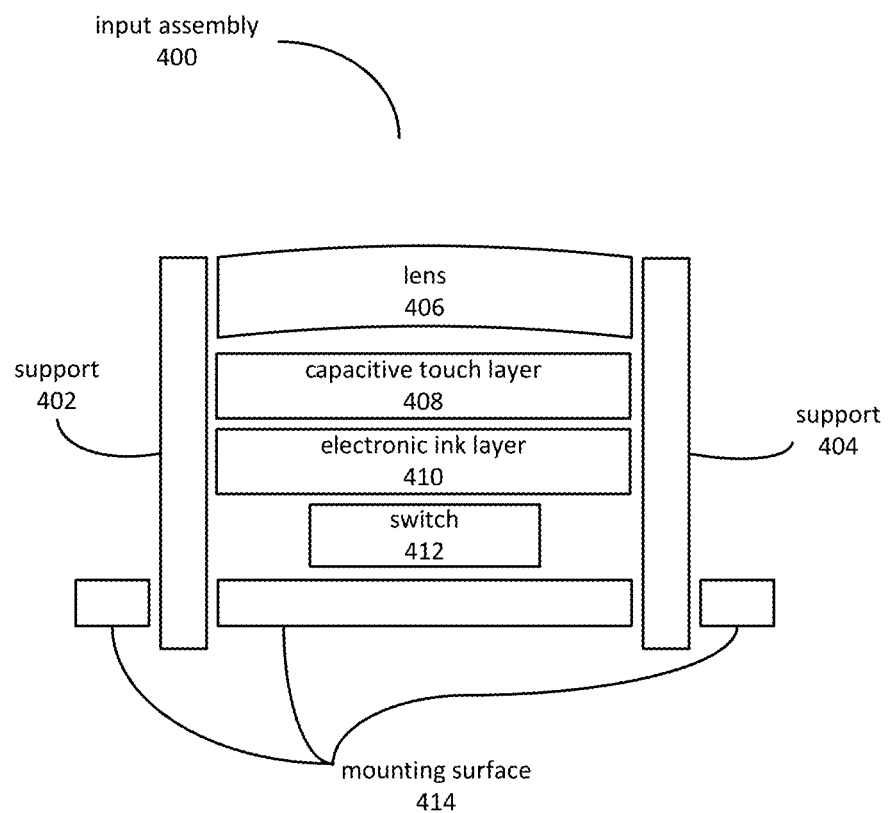
FIG. 4A depicts an example embodiment of an input assembly.

FIG. 4A depicts an example embodiment of an input assembly. An input assembly 400 may comprise a lens 406, a capacitive touch layer 408, and an electronic ink layer 410 affixed to supports 402 and 404. A switch 412 may be mounted on mounting surface 414. Supports 402 and 404 may be coupled to mounting surface 414 in a manner that allows the sub-assembly of lens 406, capacitive touch layer 408, and electronic ink layer 410 to, when pressed by a user (not shown), to activate switch 412.

Examples of coupling supports 402 and 404 to mounting surface 414 may include drilled holes or cavities in mounting surface 414. Springs, elastics, pneumatic structures, and the like may be used to return the sub-assembly of lens 406, capacitive touch layer 408, and electronic ink layer 410, affixed to supports 402 and 404, to return to a default position after the sub-assembly has been pressed.

The lens 406, capacitive touch layer 408, and electronic ink layer 410 can be affixed to supports 402 and 404 through various mechanisms, such as adhesives, screws, interlocking structures, and so forth.

Although FIG. 4A depicts supports 402 and 404 as two separate structures, in various instances more or fewer structures may be used. For example, a single structure might wrap wholly or partially around lens 406, capacitive touch layer 408, and electronic ink layer 410.

A lens 406 may be a clear or translucent material, such as glass or translucent plastic. The lens 406 can provide a magnifying effect or may otherwise be configured to provide a user of remote control 100 with a clearer view of iconography displayed by electronic ink layer 410. The lens 406 can be colored to indicate a general category of functionality, while remaining sufficiently translucent to allow the display of the electronic ink layer 410 to remain visible. Lens 406 may, in various instances, have a convex or concave curvature or may be flat. Optical properties of the lens may be selected to maintain visibility of electronic ink layer 410 while possessing a desired tactile feel. For example, embodiments might incorporate concave lenses for certain groups of buttons while making others convex. Selection on this basis may allow for improved usability by enabling a user to more easily feel for the correct button without looking at the remote control 100.

In some instances, the shape of lens 406 may be adapted to gestures that may be input using the input assembly. For example, lens 406 might be elongated for receiving swipe gestures, or enlarged for receiving more complex gestures, such as the J-shaped gesture 304 depicted in FIG. 3.

A capacitive touch layer 408 provides touch-sensing capabilities in response to user interaction with input assembly 400. The interaction may comprise the user touching or coming near to lens 406 with a finger or stylus (not shown) and performing various gestures, such as those depicted in FIG. 3. Various forms of circuitry (not shown) may connect output from capacitive touch layer 408 to other components of remote control 100. The communication mechanism may, for example, comprise circuitry connecting capacitive touch layer 408 to an input/output controller, such as the input/output controller 832 depicted in FIG. 8. A processor included in remote control 100, such as the CPU(s) 804 and GPU(s) 805 depicted in FIG. 8, may access data from capacitive touch layer 408 using the input/output controller.

An electronic ink layer 410 comprises a mechanism for displaying graphical indicia. The electronic ink layer 410 may operate in a low-power or no-power state. Examples of electronic ink layer 410 may include electrophoretic ink displays and other types of "electronic paper" that continue to display images in low-power and no-power states. In some instances, other display types could be used, including liquid crystal displays ("LCDs") or light emitting diodes ("LEDs"). The electronic ink layer 410 may be communicatively coupled to a processor of remote control 100, using a communication mechanism similar to that described with respect to capacitive touch layer 408. By using the communication mechanism, a processor of remote control 100 may cause electronic ink layer 410 to display graphical indicia that corresponds to a state of media device 108.

In some embodiments, switch 412 may include a spring, elastic, or pneumatic structure to cause the sub-assembly to return to a default position. In some cases, switch 412 may be configured to provide tactile feedback in relation to a selection gesture. In some instances, capacitive touch layer 408 may detect a selection gesture while switch 412 provides tactile feedback.

Figure 4B:
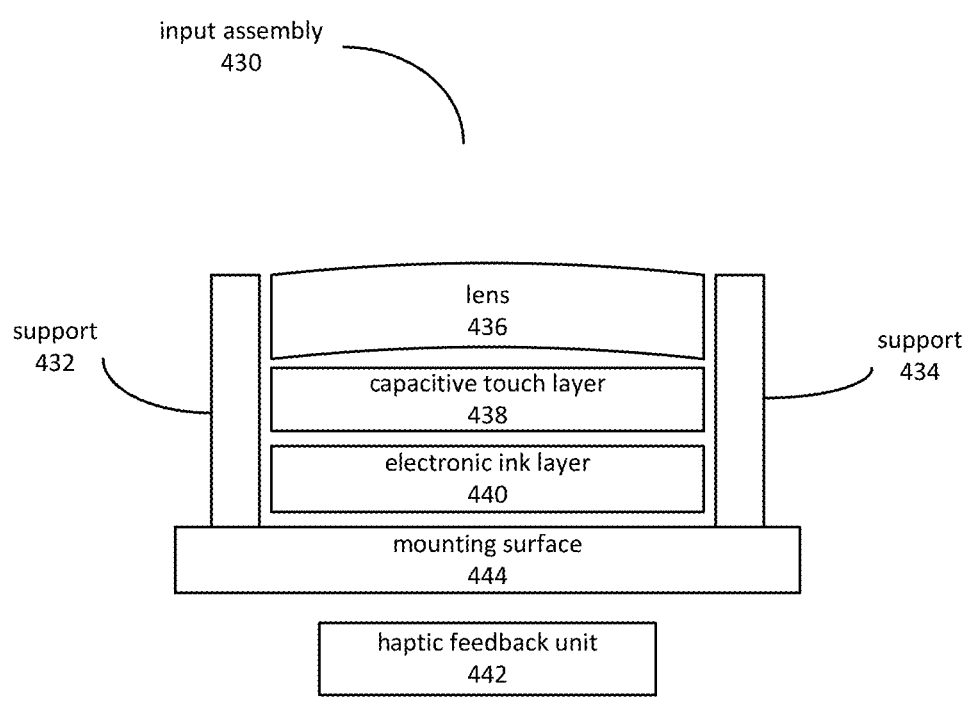
FIG. 4B depicts an example embodiment of an input assembly.

FIG. 4B depicts an example embodiment of an input assembly. An input assembly 430 may comprise a lens 436, a capacitive touch layer 438, and electronic ink layer 440 affixed to supports 432 and 434. The capacitive touch layer 438 and electronic ink layer 440 may be communicatively coupled to a processor of remote control 100, using the communication mechanism discussed in conjunction with FIG. 4A.

Supports 432 and 434 may be affixed to mounting surface 444. Rather than relying on a switch, the input assembly 430 may utilize capacitive touch layer 438 for detecting selection gestures, e.g. press gestures, and a haptic feedback unit 442 for providing tactile feedback. Supports 432 and 434, in contrast to the supports 402 and 404 depicted in FIG. 4A, may be fixed to mounting surface 444 without being configured to allow movement.

In some instances, haptic feedback unit 442 may be housed within a remote control, such as the remote control 100 depicted in FIG. 1, and may provide haptic feedback for a number of button assemblies. In other instances, haptic feedback unit 442 may comprise part of input assembly 430, and may provide haptic feedback related to user interactions with input assembly 430.

Haptic feedback unit 442 may comprise a motor, electrostatic actuator, audio actuator, electrovibration unit, or other device for inducing movement, vibrations, or audio feedback. In some instances, haptic feedback unit 442 may provide haptic feedback localized to a particular input assembly, such as input assembly 430, even when haptic feedback unit 442 is associated with more than one input assembly.

FIG. 4C depicts an additional example embodiment of an input assembly. The configuration depicted in FIG. 4C involves an array of lenses, such as the depicted lenses 466 and 468, attached to supports 460, 462, and 464. Each lens may be seen as corresponding to an input assembly, albeit with components that are shared with other button assemblies. Embodiments may utilize a two-dimensional array of lens structures embedded in support structures. For example, a control pad configuration similar to control pad 102 might be constructed from an array of five lenses superimposed over layers comprising a capacitive touch layer and an electronic ink layer.

The lenses 466 and 468 may be superimposed over a capacitive touch layer 470, an electronic ink layer 472, and a mounting surface 474. As may be seen in FIG. 4C, the array of lenses 466 and 468 may share a capacitive touch layer 470 and an electronic ink layer 472. These may be fixed to mounting surface 474. A haptic feedback unit 476 may be employed to simulate interaction with a physical device (not shown), in the manner described in conjunction with the haptic feedback unit 442 depicted in FIG. 4B.

In various embodiments, including embodiments similar to those depicted in FIGS. 4A-4C, a mounting surface, such as the mounting surface 474 depicted in FIG. 4C, may be omitted or reconfigured. For example, rather than being mounted on a horizontally positioned mounting surface 474, capacitive touch layer 470 and electronic ink layer 472 may be mounted to a vertical support surface, such as the supports 460 and 464 depicted in FIG. 4C.

In some instances, such as the example embodiment depicted in FIG. 4C, multiple lenses, such as lenses 466 and 468, may be superimposed over a single capacitive touch layer 470 and electronic ink layer 472. In such instances, a processor of remote 100 may cause graphical indicia, such as an icon, to be displayed in a correct location under, for example, lens 466 or lens 468. The processor may, for example, divide the electronic ink layer 472 into quadrants or sectors, where each quadrant or sector is under a lens, such as lenses 466 or 468. The processor may then cause an icon to be displayed in a quadrant or sector, where the icon corresponds to the function of the input assembly.

In some instances, the functions related to capacitive touch sensing and display technology might be combined into a single layer. For example, an electronic ink display might be integrated with capacitive touch sensing capabilities. It might also be the case that the positioning of the electronic ink layer and capacitive touch layer might be interchanged.

In some instances, other touch-sensing mechanisms may be substituted for capacitive touch. As used herein, the term "gesture sensing layer" may be used to refer to a layer of an input assembly that provides touch-sensing or gesture-sensing capabilities, including capacitive touch and other examples such as touch-sensing based on infrared, optical imaging, acoustic pulse recognition, and piezoelectric technologies, provided that they function in conjunctions with the presence of a lens or a lens-shaped structure. Because of the interposition of the lens, a gesture-sensing technology that functions based on proximity, rather than direct contact, may be used when a lens is interposed between the gesture-sensing layer and the exterior of the input assembly. In some instances, however, a capacitive touch layer may be combined with a lens. For example, referring back to FIG. 4A, lens 406 and capacitive touch layer 408 might be combined into a single unit. The outward-facing surface of the unit may be concave or convex, such as the outward-facing convex surface of lens 406, depicted in FIG. 4A.

In some instances, other display technologies may be substituted for electronic ink. In one example, a light guide film may be used for the electronic ink layer 408 depicted in FIG. 4A. In another example, a clear film of printed light-emitting diodes may be affixed to capacitive touch layer 408 or lens 406. Alternatively, a layer of light-emitting diodes may be printed directly onto capacitive touch layer 408 or lens 406. Placement of the layer of printed light-emitting diodes may be guided by the translucency of the layer. In some instances, the film may have sufficient translucence to allow placement between lens 406 and capacitive touch layer 408, including being printed directly on the surface of capacitive touch layer 408.

Figure 5:
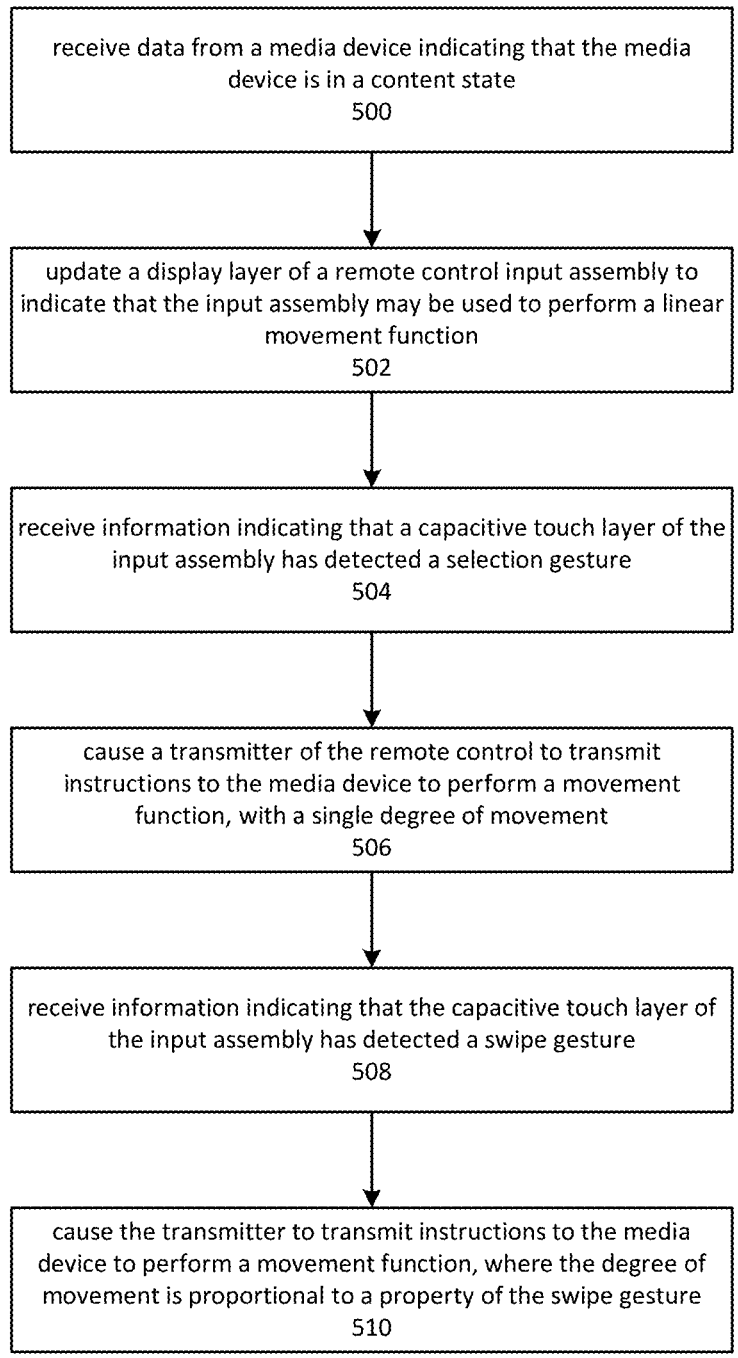
FIG. 5 is a flow diagram depicting an example of a process for controlling a media device.

FIG. 5 is a flow diagram depicting an example of a process for controlling a media device. The scenario to which FIG. 5 relates involves a media device, such as the media device 108 depicted in FIG. 1, being in a content state, e.g. playing back video and/or audio content. Although FIG. 5 is depicted as a sequence of blocks, the depicted sequence should not be construed as limiting the scope of the present disclosure. In various cases, aspects, and embodiments, the blocks and depicted operations may be altered, omitted, reordered, or performed in parallel.

At block 500, a remote control, such as the remote control 100 depicted in FIG. 1, receives data indicating that a media device, such as media device 108 is in a content presenting state. A content state may include playback, display, or other performance of audio or video content, including movies, music, television programs, and the like. In some instances, content can include interactive content, such as video games. For example, a video game that is being played might be treated as content that may be rewound to view a previously experienced portion of gameplay, or forwarded through the previously experienced portion of gameplay.

At block 502, remote control 100 updates a display layer of an input assembly to indicate that the button may be used to perform a movement function. The input assembly may, for example, be one of the buttons associated with control pad 102 in FIG. 1. The display layer might refer to an electronic ink layer incorporated into an input assembly, such as the electronic ink layer 410 in FIG. 4A, for example. The display may be updated by causing the electronic ink layer 410 to display graphical indicia that is suggestive of a movement function, such as an arrow or double-arrow symbol. FIG. 2A contains examples of such graphical indicia.

At block 504, remote control 100 receives data indicating that a capacitive touch layer of the input assembly has detected movement corresponding to a selection gesture, such as the selection gesture 300 depicted in FIG. 3. The movement may, in some instances, be detected by the capacitive touch layer. The movements may be analyzed by a processor of remote control 100 to determine that they correspond to a selection gesture. In some embodiments, such as those incorporating the switch 412 depicted in FIG. 4A, a selection gesture may be detected based on switch 412 being depressed, rather than through capacitive touch layer 408.

At block 506, remote control 100 causes a transmitter to send instructions to the media device to perform a movement function, in response to the detected selection gesture. The degree of movement for the gesture may be a single unit. In various cases, a unit might correspond to some unit of time, a scene of a movie, a song, and so forth.

At block 508, remote control 100 receives information indicating that the input assembly's capacitive touch layer has detected movement corresponding to a swipe gesture, such as the swipe gesture 302 depicted in FIG. 3. The movement may be detected by the capacitive touch layer and analyzed by a processor of remote control 100 to determine that they correspond to a swipe gesture.

At block 510, remote control 100 causes its transmitter to send data to the media device instructing it to perform a movement function, where the degree of movement, or some other parameter of the function, is proportional to one or more properties of the swipe gesture, such as the swipe's length, speed, and pressure. For example, in response to a relatively short swipe gesture, the instructions may correspond to two or three units of movement, while a relatively long swipe gesture might correspond to ten or twenty units. It will be appreciated that these examples are intended only to be illustrative, and should not be viewed as limiting the scope of the present disclosure.

Figure 6:
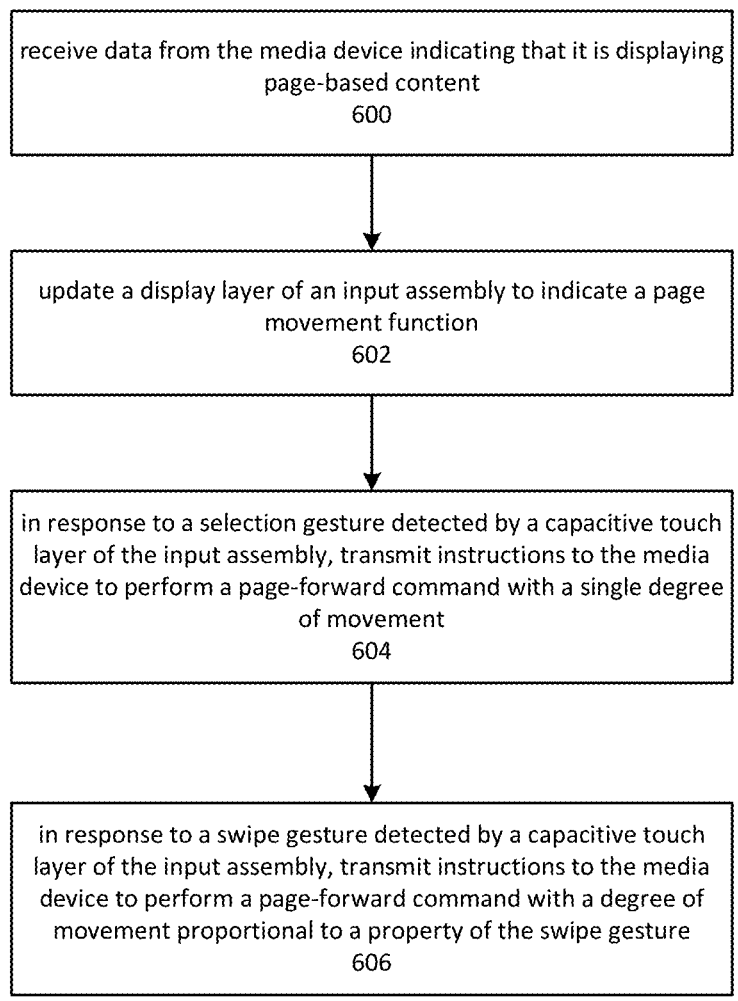
FIG. 6 is a flow diagram depicting an example of a process for controlling a media device.

FIG. 6 is a flow diagram depicting an additional example of a process for controlling a media device. FIG. 6 involves a scenario in which a media device is in a page-based state. For example, a media may be in a page-based state when it is displaying a program listing, a series of menus, or other similar content in which a user typically "pages" through the content. Although depicted as a sequence of blocks, the depicted sequence should not be construed as limiting the scope of the present disclosure. In various cases, aspects, and embodiments, the blocks and depicted operations may be altered, omitted, reordered, or performed in parallel.

At block 600, the remote 100 receives data from media device 108 indicating that the media device 100 is displaying page-based content, and accordingly is in a page-based state. The page-based state indicates that the media controller is in a state in which it can accept input relative to a menu, program listing, or other feature that has a page-based navigation mechanism. Other examples include photo albums, song collections, and configuration options.

At block 602, the remote 100 updates a display layer of an input assembly to indicate that the button may be used to perform a page movement function. Graphical indicia similar to those depicted in FIG. 2B may be used. It will be appreciated, however, that these examples are intended only to be illustrative, and should not be viewed as limiting the scope of the present disclosure. In some instances, the iconography may be customized based on a more precise categorization of the content to be navigated. For example, the iconography depicted in FIG. 2B might be replaced with a page-turn icon, or even an animation, when the corresponding media device is displaying a user manual, photo album, or other content that could be analogized to a book.

At block 604, remote control 100 receives information indicating that movement corresponding to a selection gesture has been detected by the capacitive touch layer of the input assembly. In response to receiving the information, remote control 100 sends instructions to the media device 108, instructing it to perform a single-page movement.

At block 606, remote control 100 receives information indicating that the capacitive touch layer has detected movement corresponding to a swipe gesture. In response to receiving the information, remote control 100 causes its transmitter to send data instructing the media device to perform a page movement function, where the degree of movement is proportional to a property of the swipe gesture. A relatively short swipe, for example, could correspond to moving two or three pages, while a relatively long swipe could correspond to moving ten or twenty pages, or to the next chapter. These examples are intended only to be illustrative, and should not be viewed as limiting.

Figure 7:
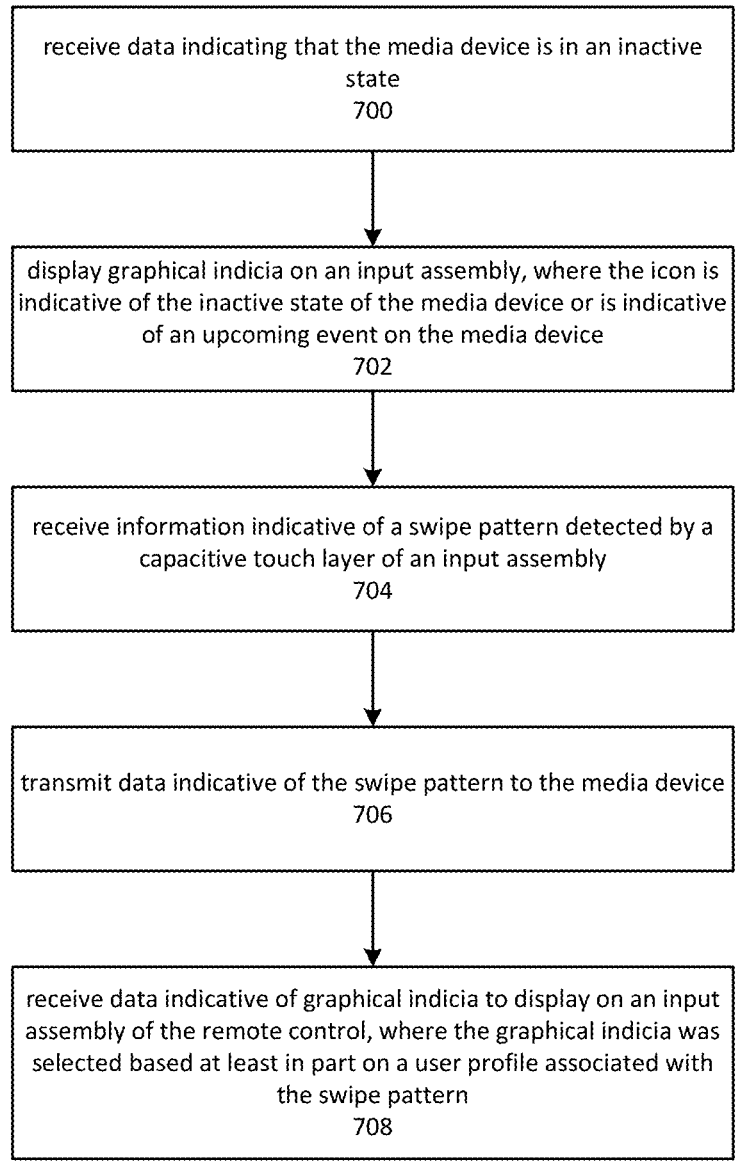
FIG. 7 is a flow diagram depicting an example of a process for controlling a media device.

FIG. 7 is a flow diagram depicting a further example of a process for controlling a media device. FIG. 7 involves a scenario in which a media device is in an inactive state, such as when the media device is in a standby state or a sleep state. FIG. 7 also involves waking the device from a sleep state and entering profile information through the use of an input assembly. Although depicted as a sequence of blocks, the depicted sequence should not be construed as limiting the scope of the present disclosure. In various cases, aspects, and embodiments, the blocks and depicted operations may be altered, omitted, reordered, or performed in parallel.

At block 700, remote control 100 receives data indicating that the media device 108 is in an inactive state. The inactive state may correspond to a standby state, screen-saver mode, or other state in which a media device, such as media device 108, is not displaying material for which other control categories (such as those associated with content or menu pages) would be applicable.

At block 702, remote control 100 responds to the data received at block 700 by displaying graphical indicia on an input assembly of remote 100. The graphical indicia may be an icon or other graphic indicating that the media device 108 is in an inactive state. One example is depicted in FIG. 2C. In some instances, the graphical indicia may be indicative of an upcoming event on the media device, or an event that has transpired. For example, an input assembly might be updated with graphics corresponding to the next television program the media device is scheduled to record. Upon user interaction with the input assembly, the remote control 100 may send instructions that cause the media device 108 to display information about the recording schedule. If the television program has already been recorded, interaction with the input assembly may cause remote control 100 to instruct media device 108 to begin playing back the recorded program.

At block 704, remote control 100 receives information indicative of a swipe pattern detected by the capacitive touch layer of an input assembly on the remote control 100. The data may, as depicted by block 706, be processed and transmitted to the media device 108, which may use the data to determine a user of remote control 100 that is associated with the swipe pattern. The media device 100 may have access to a set of profile information for users of the remote, and may identify profile information associated with a specific swipe gesture. At block 708, remote control 100 receives an indication of graphical indicia to display on one or more button assemblies of remote control 100, where the graphical indicia were selected based at least in part on the user's profile information associated with the swipe pattern. For example, remote control 100 might comprise a set of buttons that could be updated to display icons corresponding to the detected user's favorite programs. In some instances, the media device 108 transmits the graphical indicia to the remote control 100 in response to accessing the profile information. In other instances, the graphical indicia are maintained on remote control 100. The media device 108 may, in such instances, transmit profile information to remote control 100 upon determining the identity of the user and retrieving the profile information. The remote control 100 may then select a graphical indicia that is associated with the profile information.

Figure 8:
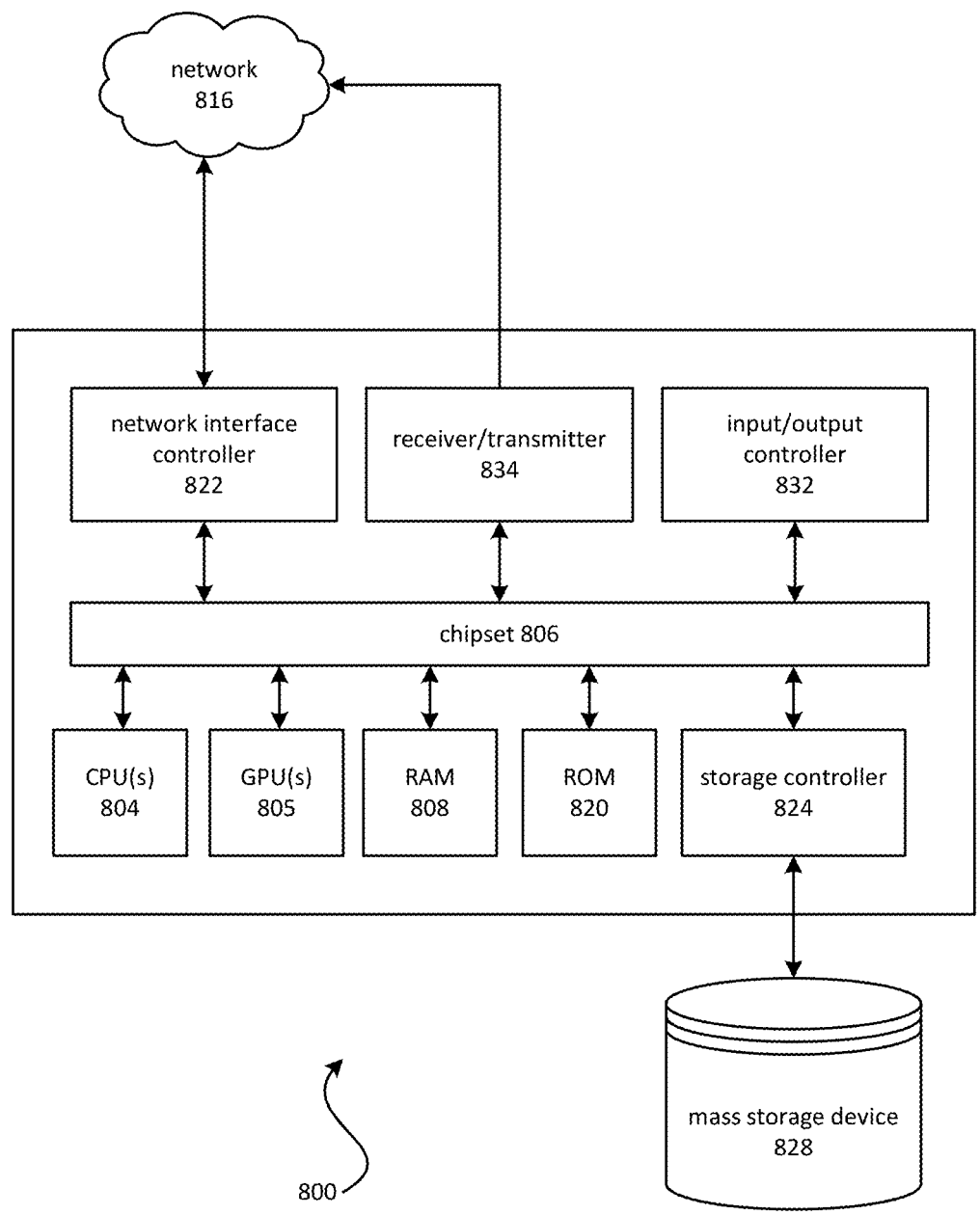
FIG. 8 is a block diagram depicting various aspects of a computing environment in which aspects of the present disclosure may be practiced.

FIG. 8 depicts a computing device that may be used in various aspects, such as the remote control 100 depicted in FIG. 1. The computer architecture shown in FIG. 8 illustrates a computing device adapted to provide remote control functionality. This may include a remote control device, home automation system, desktop computer, laptop, tablet, network appliance, e-readers, smartphone, or other computing device, and may be utilized to execute any aspects of the computers described herein, such as to implement the operating procedures of FIGS. 5, 6, and 7.

Computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. CPU(s) 804 may be standard programmable processors that perform arithmetic and logical operations necessary for the operation of computing device 800.

CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

CPU(s) 804 may, in various embodiments, be augmented with or replaced by other processing units, such as GPU(s) 805. GPU(s) 805 may comprise processing units specialized for but not necessarily limited to highly parallel computations, such as graphics and other visualization-related processing.

Chipset 806 may provide an interface between CPU(s) 804 and the remainder of the components and devices on the baseboard. Chipset 806 may provide an interface to a random access memory (RAM) 808 used as the main memory in computing device 800. Chipset 806 may further provide an interface to a computer-readable storage medium, such as a read-only memory (ROM) 820 or non-volatile RAM (NVRAM) (not shown), for storing basic routines that may help to start up computing device 800 and to transfer information between the various components and devices. ROM 820 or NVRAM may also store other software components necessary for the operation of computing device 800 in accordance with the aspects described herein.

Computing device 800 may operate in a networked environment using logical connections to remote computing nodes and computer systems through local area network (LAN) 816. Chipset 806 may include functionality for providing network connectivity through a network interface controller (NIC) 822, such as a gigabit Ethernet adapter. NIC 822 may be capable of connecting the computing device 800 to other computing nodes over network 816. It should be appreciated that multiple NICs 822 may be present in computing device 800, connecting the computing device to other types of networks and remote computer systems.

Computing device 800 may be connected to a mass storage device 828 that provides non-volatile storage for the computing device 800. Mass storage device 828 may store system programs, application programs, other program modules, and data, which have been described in greater detail herein. Mass storage device 828 may be connected to computing device 800 through a storage controller 824 connected to chipset 806. Mass storage device 828 may consist of one or more physical storage units. Storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computing device 800 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 828 is characterized as primary or secondary storage and the like.

For example, computing device 800 may store information to mass storage device 828 by issuing instructions through storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computing device 800 may further read information from mass storage device 828 by detecting the physical states or characteristics of one or more particular locations within the physical storage units.

In addition to mass storage device 828 described above, computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

Mass storage device 828 may store an operating system utilized to control the operation of the computing device 800. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. Mass storage device 828 may store other system or application programs and data utilized by computing device 800.

Mass storage device 828 or other computer-readable storage media may also be encoded with computer-executable instructions, which, when loaded into computing device 800, transforms the computing device from a general-purpose computing system into a special-purpose computer capable of implementing the aspects described herein. These computer-executable instructions transform computing device 800 by specifying how CPU(s) 804 transition between states, as described above. Computing device 800 may have access to computer-readable storage media storing computer-executable instructions, which, when executed by computing device 800, may perform operating procedures depicted in FIGS. 5-7.

A computing device 800 may also include an input/output controller 832 for receiving and processing input from a number of input devices, such as a keyboard, a mouse, a touchpad, a touch screen, an electronic stylus, or other type of input device. Similarly, input/output controller 832 may provide output to a display, such as a computer monitor, a flat-panel display, a digital projector, a printer, a plotter, or other type of output device. It will be appreciated that computing device 800 may not include all of the components shown in FIG. 8, may include other components that are not explicitly shown in FIG. 8, or may utilize an architecture completely different than that shown in FIG. 8.

As described herein, a computing device may be a physical computing device, such as computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

A receiver/transmitter 834 may be included in computing device 800 for communicating with a media device, such as the media device 108 depicted in FIG. 1. In some instances, receiver/transmitter 834 may be combined with other aspects of computing device 800, such as NIC 822. This may be the case, for example, where communication with media device 108 occurs using a network. In other instances, receiver/transmitter 834 may comprise means of receiving data through radio transmissions, infrared, or other communications media.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices disclosed herein. It is intended that the specification and example figures be considered as exemplary only, with a true scope and spirit being indicated by the following claims.

What is claimed is:

1. A device comprising:
   one or more processors; and
   memory storing instructions that, when executed by the one or more processors, cause the device to:
   determine, based on a first input, a gesture performed in a first orientation on an icon;

send, to a media device, based on the gesture performed in the first orientation on the icon, a first indication of a function;

determine, based on a second input, the gesture performed in a second orientation on the icon, wherein the second orientation is different than the first orientation; and send, to the media device, based on the gesture performed in the second orientation on the icon, a second indication of the function.

2. The device of claim 1, wherein the instructions, when executed by the one or more processors, further cause the device to:

cause simulation of a button press in response to the gesture; or cause simulation of a plurality of button selection gestures in response to the gesture.

3. The device of claim 1, wherein the instructions, when executed by the one or more processors, further cause the device to:

receive, from the media device, data upon waking from a sleep state, the data received in a periodic broadcast of state information associated with the media device.

4. The device of claim 3, wherein the instructions, when executed by the one or more processors, further cause the device to:

transmit a request for state information in response to entering a wake cycle.

5. The device of claim 1, wherein the instructions, when executed by the one or more processors, further cause the device to:

receive, from the media device, data indicating an inactive state of the media device and graphical indicia corresponding to a next event on the media device; and display the graphical indicia corresponding to the next event.

6. The device of claim 1, further comprising:

a gesture sensing layer superimposed on one or more display layers.

7. The device of claim 1, wherein the instructions, when executed by the one or more processors, further cause the device to:

determine a second gesture based on detection of the second gesture;

transmit, to the media device, first data indicating the second gesture;

receive, from the media device, second data indicating a user profile associated with the second gesture; and display a graphical indicia selected based at least in part on the second data.

8. A method comprising:

determining, based on a first input, a gesture performed in a first orientation on an icon;

sending, to a media device, based on the gesture performed in the first orientation on the icon, a first indication of a function;

determining, based on a second input, the gesture performed in a second orientation on the icon, wherein the second orientation is different than the first orientation; and sending, to the media device, based on the gesture performed in the second orientation on the icon, a second indication of the function.

9. The method of claim 8, wherein a gesture sensing layer that is part of an input assembly comprising a display layer performs at least one of:

the determining, based on the first input, the gesture performed in the first orientation on the icon, or the determining, based on the second input, the gesture performed in the second orientation on the icon, wherein the second orientation is different than the first orientation.

10. The method of claim 9, further comprising:

maintaining an image in at least one of a low-power state or a no-power state.

11. The method of claim 8, further comprising:

receiving, from the media device, data indicating an inactive state of the media device; and causing display of a graphic indicating a default function.

12. The method of claim 8, further comprising:

receiving, from the media device, information indicating a graphical indicia corresponding to an upcoming event on the media device; and causing display of the graphical indicia corresponding to the upcoming event.

13. The method of claim 8, further comprising:

receiving, from the media device, a graphical indicia corresponding to a chapter of content; and transmitting, to the media device, information indicating selection of playing the chapter of content based at least in part on a third gesture.

14. The device of claim 1, wherein the gesture comprises at least one of a: a swipe gesture or a J-shaped gesture.

15. The device of claim 14, wherein the gesture causes a greater degree of movement through content on the media device than a selection gesture.

16. The method of claim 8, wherein the gesture comprises at least one of a: a swipe gesture or a J-shaped gesture.

17. The method of claim 16, wherein the gesture causes a greater degree of movement through content on the media device than a selection gesture.

18. A non-transitory computer-readable storage medium storing computer-readable instructions that, when executed by a processor, cause:

determining, based on the first input, a gesture performed in a first orientation on an icon;

sending, to a media device, based on the gesture performed in the first orientation on the icon, a first indication of a function;

determining, based on a second input, the gesture performed in a second orientation on the icon, wherein the second orientation is different than the first orientation; and sending, to the media device, and based on the gesture performed in the second orientation on the icon, a second indication of the function.

19. The non-transitory computer-readable storage medium of claim 18, wherein the gesture comprises at least one of a: a swipe gesture or a J-shaped gesture.

20. The non-transitory computer-readable storage medium of claim 19, wherein the gesture causes a greater degree of movement through content on the media device than a selection gesture.

* * * * *